US010091347B2

(12) United States Patent
Matsushima

(10) Patent No.: US 10,091,347 B2
(45) Date of Patent: Oct. 2, 2018

(54) RELAYING DEVICE, AUDIO COMMUNICATION SYSTEM, AND RELAYING METHOD OF AUDIO SIGNAL

(71) Applicant: ICOM INCORPORATED, Osaka (JP)

(72) Inventor: Hisaaki Matsushima, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 15/033,197

(22) PCT Filed: Oct. 31, 2014

(86) PCT No.: PCT/JP2014/079135
§ 371 (c)(1),
(2) Date: Apr. 29, 2016

(87) PCT Pub. No.: WO2015/068666
PCT Pub. Date: May 14, 2015

(65) Prior Publication Data
US 2016/0269546 A1 Sep. 15, 2016

(30) Foreign Application Priority Data
Nov. 7, 2013 (JP) .................. 2013-231600

(51) Int. Cl.
*H04W 4/08* (2009.01)
*H04M 3/56* (2006.01)
(Continued)

(52) U.S. Cl.
CPC .......... *H04M 3/00* (2013.01); *H04L 12/6418* (2013.01); *H04M 3/56* (2013.01); *H04W 4/08* (2013.01);
(Continued)

(58) Field of Classification Search
CPC ...... H04M 15/8077; H04M 3/00; H04M 3/56; H04L 12/6418; H04L 29/6418;
(Continued)

(56) References Cited

U.S. PATENT DOCUMENTS

2003/0053434 A1* 3/2003 Chow .................. H04W 4/10
370/338
2003/0207690 A1* 11/2003 Dorenbosch ........ H04W 76/005
455/445
(Continued)

FOREIGN PATENT DOCUMENTS

CN 102687540 A 9/2012
JP 2009-232048 A 10/2009
(Continued)

OTHER PUBLICATIONS

3GPP TR 23.768, vol. SA WG2, No. V0.3.0, Jul. 2013 (3GPP-1), Jul. 2013.*
(Continued)

Primary Examiner — Dong-Chang Shiue
(74) Attorney, Agent, or Firm — Muncy, Geissler, Olds & Lowe, P.C.

(57) ABSTRACT

[Problem] To provide an audio communication system in which a relaying device is connected to communication devices via a communication network, the communication devices being terminal devices, and the current location of each terminal device is managed by the relaying device.
[Solution] this relaying device is provided with a network communication unit, a control unit, and a storage unit. The control unit divides the communication area of a communication network into a plurality of partial communication areas and stores, in the storage unit, location information indicating which partial communication area each terminal device is in. Upon a partial communication area specifying call from a calling terminal device, the calling terminal
(Continued)

device being one of the aforementioned terminal devices, the control unit establishes a communication session in which the calling terminal device and terminal devices in the specified partial communication area participate, and audio signals received from terminal devices participating in the communication session are transferred by the control unit to the other terminal devices participating in the communication session.

26 Claims, 9 Drawing Sheets

(51) Int. Cl.
    *H04M 3/00*     (2006.01)
    *H04W 4/10*     (2009.01)
    *H04L 12/64*     (2006.01)
    *H04W 84/12*     (2009.01)
    *H04W 88/16*     (2009.01)
    *H04W 88/02*     (2009.01)

(52) U.S. Cl.
    CPC .............. *H04W 4/10* (2013.01); *H04W 84/12* (2013.01); *H04W 88/02* (2013.01); *H04W 88/16* (2013.01)

(58) Field of Classification Search
    CPC .... H04L 29/06442; H04W 4/08; H04W 4/10; H04W 4/025; H04W 4/023; H04W 76/002; H04W 76/005
    See application file for complete search history.

(56) References Cited

U.S. PATENT DOCUMENTS

| | | | | |
|---|---|---|---|---|
| 2011/0249658 | A1* | 10/2011 | Wohlert | H04W 4/04 370/338 |
| 2013/0188547 | A1* | 7/2013 | Moriwaki | H04W 72/005 370/312 |
| 2014/0177437 | A1* | 6/2014 | Korus | H04W 76/00 370/230 |

FOREIGN PATENT DOCUMENTS

| | | | |
|---|---|---|---|
| JP | 2009-267911 A | | 11/2009 |
| JP | 2013-012793 A | | 1/2013 |
| JP | 2013-058872 A | | 3/2013 |
| JP | 2013058872 A | * | 3/2013 |
| WO | 2011/083729 A1 | | 7/2011 |

OTHER PUBLICATIONS

International Search Report of PCT/JP2014/079135.
Etsi, "Digital cellular telecommunications system (Phase 2+); Voice Group Call Service (VGCS); Stage 2", (Dec. 12, 2012), pp. 2013-2, URL: http://www.etsi.org/deliver/etsi_ts/143000_143099/143068/11.04.00_60/ts_143068v110400p.pdf, retrieved Aug. 21, 2017, XP055371447 [X] 1-15 * Group Call Register (GCR); p. 8 * * p. 10, paragraph 2 * * p. 11, paragraphs 3,4,7 * * p. 12, paragraph 3 * * 7.1a.3; p. 27 * * 8.1.2.1; p. 34 * * p. 41, paragraphs 5-6 *.
Extended European search report for EP Application No. 14860588 dated May 19, 2017.

* cited by examiner

| DESTI-NATION IP ADDRESS | SENDER IP ADDRESS | PAYLOAD | | | | |
|---|---|---|---|---|---|---|
| | | AUDIO SIGNAL | PARTNER IDENTIFICATION NUMBER (SESSION NUMBER) | AREA INFOR-MATION | NEIGHBORING COMMUNI-CATION FLAG | SOURCE TERMINAL NUMBER |

TERMINAL TABLE 301

| TERMINAL NUMBER | ACTIVE FLAG | CONFIGURATION DATA STORAGE ADDRESS | CONNECTING AP NUMBER (SSID) |
|---|---|---|---|
| 0 | ○ | - | - |
| 1 | ○ | 001 | 00-90-C7-XX-XX-01 |
| 2 | ○ | 002 | 00-90-C7-XX-XX-01 |
| ⋮ | ⋮ | ⋮ | ⋮ |
| 99 | ○ | 099 | 00-90-C7-XX-XX-03 |
| 100 | × | 100 | 00-90-C7-XX-XX-03 |

FIG.6A

GROUP TABLE 302

| GROUP NUMBER | BELONGING TERMINAL |
|---|---|
| G1 | 1,2,3,4,5 |
| G2 | 6,7,8,9,10 |
| ⋮ | ⋮ |
| G20 | 96,97,98,99,100 |

FIG.6B

MIXING TABLE 303

| SESSION NUMBER | CALLING TERMINAL | EXTRA TERMINAL | EXCLUDED TERMINAL | PARTICIPATING TERMINAL | HOLDING TIME (TS) |
|---|---|---|---|---|---|
| G1 | 23 | 23 | 2 | 1,3,4,5,23 | 1500 |
| 19 | 2 | — | — | 2,19 | 1500 |
| A | 6 | — | 1,2,3,4,5, 19,23,100 | 6,7,8,⋯,17,18,20, 21,22,24,⋯,99 | 1500 |

FIG.6C

AREA TABLE /304

| AREA NUMBER | AP NUMBER (SSID) |
|---|---|
| 1 | 00-90-C7-XX-XX-01<br>00-90-C7-XX-XX-02 |
| 2 | 00-90-C7-XX-XX-03 |
| ⋮ | ⋮ |
| 5 | 00-90-C7-XX-XX-YY |

FIG.6D

MIXING TABLE /303

| SESSION NUMBER | CALLING TERMINAL | EXTRA TERMINAL | EXCLUDED TERMINAL | PARTICIPATING TERMINAL | HOLDING TIME (TS) |
|---|---|---|---|---|---|
| G1 | 3 | – | 4,5 | 1,2,3 | 1500 |

FIG.7A

MIXING TABLE /303

| SESSION NUMBER | CALLING TERMINAL | EXTRA TERMINAL | EXCLUDED TERMINAL | PARTICIPATING TERMINAL | HOLDING TIME (TS) |
|---|---|---|---|---|---|
| A | 0 | – | 1,2,⋯ | 0,99 | 1500 |

FIG.7B

RELAYING DEVICE, AUDIO COMMUNICATION SYSTEM, AND RELAYING METHOD OF AUDIO SIGNAL

BACKGROUND OF THE INVENTION

Technical Field

The present invention relates to an audio communication system using a network such as a wireless LAN.

Background Art

It has been mainly used as a device performing audio communication by radio wave that a so-called radio communication device which modulates a high frequency carrier at a continuous time signal in an analog signal or a digital signal and transmits the modulated carrier. Although the wireless communication apparatus basically performs one-on-one communication, it has also been proposed the wireless communication apparatus with a group communication function that communicates with a multiple wireless apparatus at the same time.

Furthermore, a conventional radio communication apparatus can communicate with another radio communication apparatus within a range of its own radio reaching. However, in recent years, a radio communication system in which a plurality of repeaters are connected by a network has been provided as described in Patent Literature 1. Since the communication between the radio communication systems becomes possible in a communication area which consists of a cover area of a plurality of the repeaters, communication range becomes wider than the conventional.

PRIOR ART REFERENCE

Patent Literature

Patent Literature 1: Japanese Unexamined Patent Publication No. 2009-267911

BRIEF SUMMARY OF THE INVENTION

The radio communication apparatus mentioned above can perform a group communication in the communicable range, however, it is hard to provide the communicable range into a plurality of areas and call only a radio communication apparatus in an area, such as calling only a radio communication apparatus in an area near its own apparatus.

The purpose of the present invention is to provide an audio communication system that enables a user to call a terminal device in area units with a simple configuration by connecting a relaying device with a terminal device via a communication network and making the relaying device control current position (area) information of each terminal device.

A relaying device of the present invention comprises a network communication unit, a control unit, and a storage unit. The network communication unit communicates with a plurality of terminal devices via a communication network including a wireless network. The control unit controls communication of an audio signal with the terminal device. The control unit divides the communication area of the communication network into a plurality of partial communication areas and stores position information showing in which partial communication area each terminal device is in the storage unit. The control unit also establishes the communication session in which the calling terminal device and the terminal device being in the designated partial communication area participate and performs relaying processing to transfer the audio signal received from the terminal device participating in the communication session to another terminal device participating in the same communication session when the calling terminal device which is one of the terminal devices calls to designate the partial communication area.

A relaying method for relaying the audio signal of the present invention relays the audio signal using the relaying device having the network communication unit for communicating with the terminal device via the network and the storage unit for storing the position information of the terminal device. In a first step, the relaying device divides the communication area of the communication network into a plurality of the partial communication areas and stores the position information showing in which position communication area each terminal device is in the storage unit. In a second step, the relaying device establishes the communication session in which the calling terminal device and the terminal device which is in the designated partial communication area participate when the calling terminal device which is one of the terminal devices calls to designate the partial communication area. In a third step, the relaying device transfers the audio signal received from the terminal device participating in the communication session to another terminal device which participates in the same communication session.

A program of the present invention drives the control unit of the relaying device having the network communication unit for communicating with the terminal device via network and the storage unit for storing the position information of the terminal device to function as a first means, a second means, and a third means. The first means divides the communication area of the communication network into a plurality of the partial communication area and stores the position information showing in what partial communication area each terminal device is in the storage unit. The second means establishes the communication session in which the calling device and the designated terminal device in the partial communication area participate when a calling device, one of the terminal devices, calls to designate the partial communication area. The third means transfers the audio signal received from the terminal device participating in the communication session to another terminal device participating in the same communication session.

The calling designating the partial communication area may mean designating the partial communication area in which the calling terminal device is (a neighboring calling).

The communication session in which the calling terminal device and the terminal device being in the designated partial communication area and belonging to the designated prepared group participate may be established when the calling designating the partial communication area and the prepared group is performed by the calling terminal device.

The terminal device may be made to participate in the communication session when the terminal device which is out of the designated partial communication area moves and enters there.

The terminal device may be excluded from the communication session when the terminal device participating in the communication session moves out of the designated partial communication area.

The communication network may have a plurality of wireless access points. Each terminal device may be connected to the communication network via any of the wireless access points respectively. The partial communication areas respectively consist of one or a plurality of cover areas of the wireless access point and the storage unit may store what wireless access point is connected to each terminal device respectively as the position information. The calling designating the partial communication area by the calling terminal device may mean designating any one of the wireless access points.

The control unit of the relaying device may update the position information stored in the storage unit, receiving information of the connecting wireless access point from the terminal device periodically or at any predetermined timing.

An audio communication system of the present invention has the relaying device connected to each communication network and a plurality of the terminal devices. The relaying device comprises the network communication unit for communicating with a plurality of the terminal devices via the communication network, the control unit for controlling the communication of the audio signal with the terminal device, and the storage unit. The control unit divides the communication area of the communication network into a plurality of the partial communication area and stores the position information showing in which partial communication area each terminal device is in the storage unit. Moreover, the control unit establishes the communication session in which the calling terminal device and the terminal device being in the designated partial communication area participate and performs relaying processing to transfer the audio signal received from the terminal device participating in the communication session to another terminal device participating in the same communication session when the calling terminal device which is one of the terminal devices calls to designate the partial communication area. The terminal device comprises a terminal communication unit for communicating with the relaying device via the communication network, a position information acquiring means for acquiring its own position information, a position information updating means for transferring the acquired position information to the relaying device, and a calling means for transferring the calling designating any one of the partial communication area to the relaying device in response to the specific operation by the user.

In the audio communication system above, the communication network has a plurality of the wireless access points, a plurality of the terminal devices are connected to the communication network via any one of the wireless access points respectively, and each of the function units may be driven to function as follows. The control unit of the relaying device divides the communication area in each cover area of a wireless access point or a plurality of wireless access points and provides each of them as the partial communication area. The terminal network communication unit communicates with the relaying device via any one of the wireless access points. The position information acquiring means acquires the identifying information of the wireless access point with which its own device is communicating. The position information updating means transmits the acquired identifying information of the wireless access point to the relaying device as its own position information. The calling means transmits the calling designating any one of the wireless access points to the relaying device.

In the audio communication system above, the calling means transmits the calling designating its own connecting wireless access point to the relaying device.

In the audio communication system, the terminal device further comprises a push-to-talk circuit, and the terminal network communication unit may transmit the audio signal input from the microphone to the relaying device while the push-to-talk circuit is in ON status and receive the audio signal transmitted from the relaying device regardless of that the push-to-talk circuit is in ON/OFF status.

According to the present invention, it will be able to call a terminal device in area units by connecting a relaying device with a terminal device via a communication network, making the relaying device control current position (area) information of each terminal device, and providing a mixing group in area units.

BRIEF DESCRIPTION OF DRAWINGS

FIG. 6A shows a terminal table which is provided in the server.

FIG. 6B shows a group table which is provided in the server.

FIG. 6C shows a mixing table which is provided in the server.

FIG. 6D shows an area table which is provided in the server.

FIG. 7A shows a mixing table which is provided in the server.

FIG. 7B shows a mixing table which is provided in the server.

DETAILED DESCRIPTION OF THE EMBODIMENT

Figure 1:
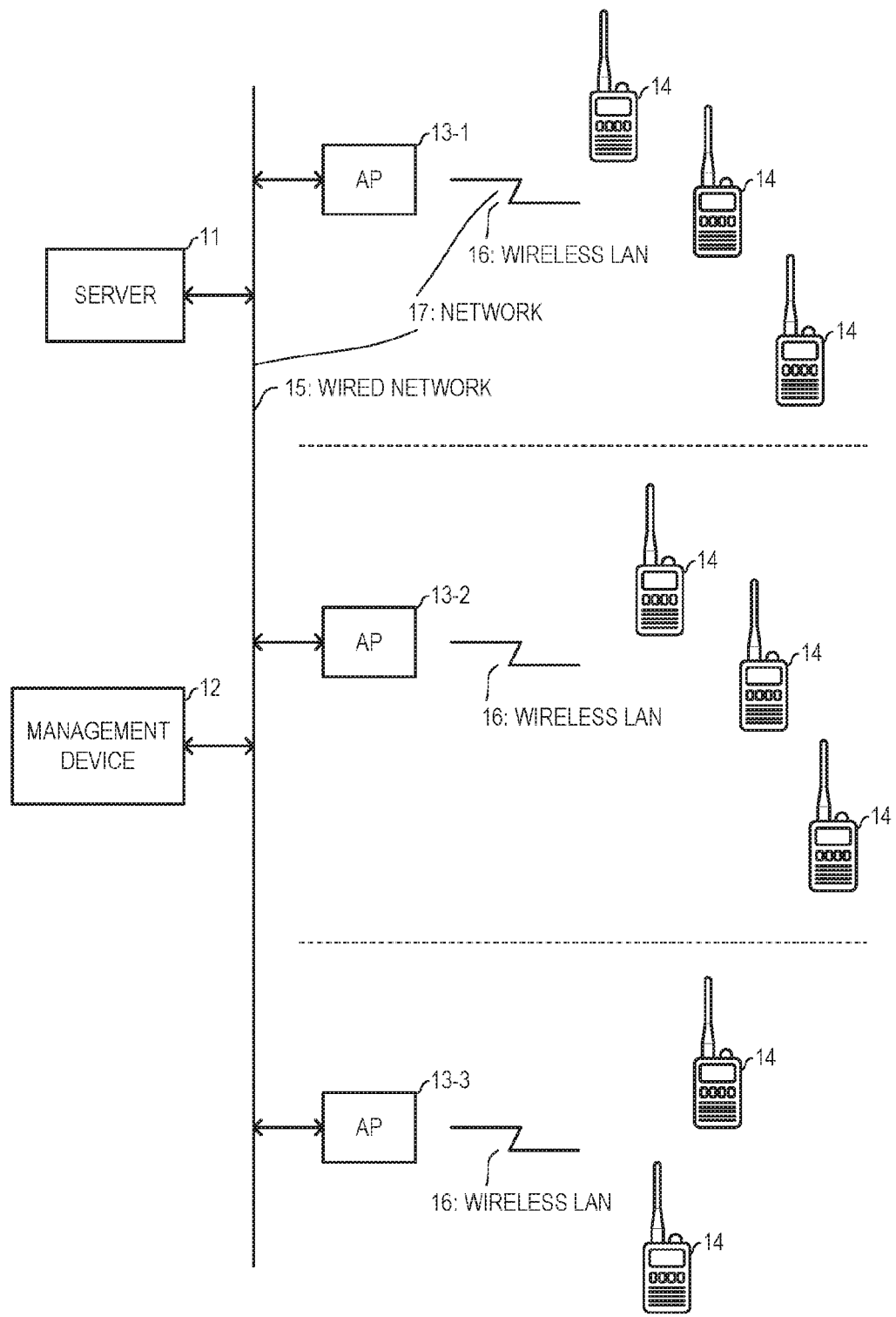
FIG. 1 shows a configuration of a communication system according to the embodiment of the present invention.
Figures 2, 3:
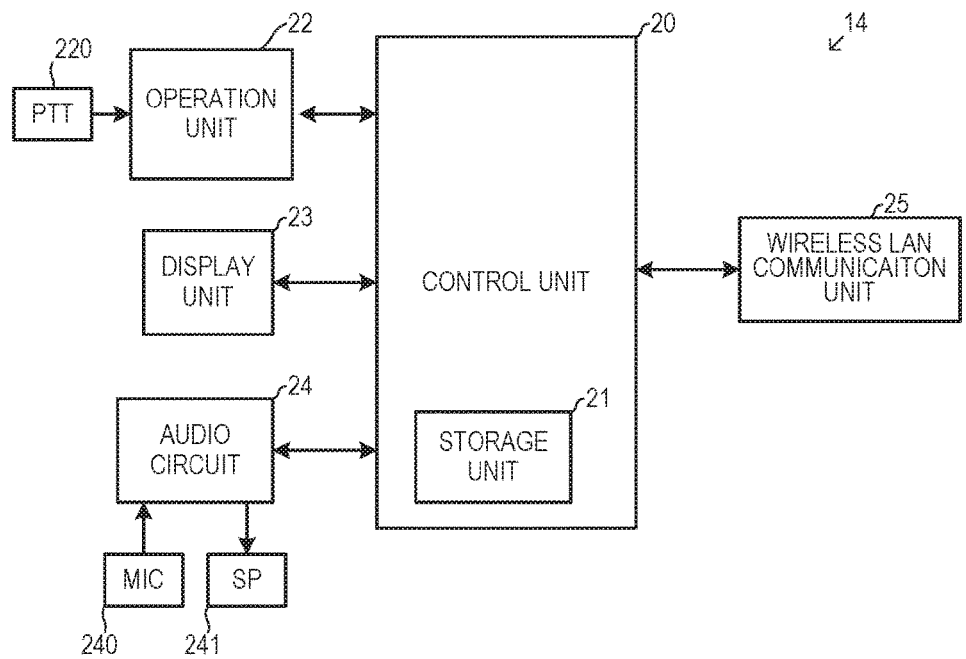
FIG. 2 is a block diagram of a transceiver which is a terminal device.
FIG. 3 shows an example of a constitution of a voice packet.

Referring to the figures, an audio communication system, which is the embodiment of the present invention, will be explained. FIG. 1 shows a configuration of a communication system according to the embodiment of the present invention. In the audio communication system, a plurality of terminal devices 14 communicate mutually, using a wireless LAN 16 such as Wi-Fi. The shape of the terminal device 14 is similar to a handy transceiver for wireless communication, which has a push-to-talk (Push to Talk: PTT) switch 220 as shown in FIG. 2. In terms of functions, the terminal device 14 is a wireless network device which transmits and receives the voice packet via a wireless access point (AP) 13-1, 13-2, 13-3 (hereinafter, collectively referred as a wireless access point 13). A plurality of the wireless access points 13 are provided (three in FIG. 1) and each wireless access point 13-1, 2, 3 and the server 11 as the relaying device are connected mutually by a wired network 15. The server 11 relays the mutual communication of a plurality of the terminal devices 14 via the wired network 15 or a wireless Local Area Network (LAN) 16. Hereinafter, the wired network 15 and the wireless LAN 16 are collectively referred as a network 17.

A plurality of the wireless access points 13 are installed. Each wireless access point 13 is installed respectively, for example, on a different floor or in a different room of a building. Each wireless access point 13 has all or a part of coverage areas of each floor or each room wherein it is installed. It is possible for the server 11 to estimate the floor or the room where the terminal device stays, depending on which communication areas of the wireless access points 13 the terminal device is belonging to.

The terminal device 14 is connected to the network 17 on start-up in the coverage area of each wireless access point 13. The server 11 transmits configuration data to the terminal device 14 and sets up the terminal device 14 to communicable state when the terminal device 14 is connected to the network 17. The configuration data which the server 11 transmits, for example, is the terminal number with which the terminal device 14 can communicate, the updating program, or the like. Furthermore, at any subsequent timing thereafter, the configuration data is transmitted to the terminal device 14. The any subsequent timing thereafter is, for example, at regular time intervals or when it moves to a coverage area of a different wireless access point 13.

Ethernet (registered trademark) LAN, the Internet and the like can be used as the wired network 15. Secure communication is available by using Virtual Private Network (VPN) when the wired network 15 includes the Internet. A communication system based on IEEE802.11 such as Wi-Fi can be applied as the wireless LAN 16. The terminal device 14 communicates with the wireless access point 13 via the communication system of the wireless LAN 16.

The server 11 divides all coverage areas of the audio communication system which is consisted of coverage areas of all the wireless access points 13 into a plurality of partial communication areas and manage them. In the embodiment, the areas are divided by the coverage area of each wireless access point 13, and each divided area is provided as the partial communication area. As shown in the area table in FIG. 6D, all coverage areas may be divided by the coverage area of one or a plurality of the wireless access points 13, and each divided area may be provided as the partial communication area. The server 11 receives information of the connecting wireless access point 13 (SSID) and manages the current position of the terminal device 14.

The terminal device 14 communicates with another terminal device 14 by an individual communication, a group communication, a plenary communication (a plenary calling) or a neighboring communication (a neighboring calling). The individual communication performs one-on-one communication that the terminal device 14 designates another terminal device 14. The group communication performs communication that the terminal device 14 calls the prepared group and communicates with another terminal device 14 which belongs to the group. The plenary communication performs communication with all communicable terminal devices 14 which are connected to the network 17 by the plenary calling of the terminal device 14. In the group communication or the plenary communication, mutual communication among three or more terminal devices is possible. The neighboring communication performs communication with another terminal device 14 which is in the neighborhood of its own terminal device 14 by the neighboring calling of the terminal device. In the embodiment, the cover area (the partial communication area) of the wireless access point 13 to which the terminal device 14 connects is called a range of the neighboring, that is, the neighboring area. Details about the neighboring communication area is described later.

The user can select the communication form from these by operating the terminal device 14. In the neighboring communication, there are a form communicating with all of the communicable terminal devices in the neighboring area (a plenary neighboring communication) and a form communicating with the terminal devices 14 belonging to the group provided beforehand (the prepared group) of the terminal devices in the neighboring area (a group neighboring communication). In the embodiment, the neighboring communication contains both of the plenary neighboring communication and the group neighboring communication.

In FIG. 1, the management device 12 is connected to the wired network 15, which consists, for example, of a personal computer in which the management program is installed. The management device 12 accesses the server 11 in response to the operation by the administrator and provides a table in the server 11 as shown in FIG. 6A and the like. Moreover, the management device 12 drives to function as a terminal device and can communicate with another terminal device 14. The management device 12 can perform the calling of the designated area communication as well as the calling of the individual communication, the group communication and the plenary communication. The designated area communication performs communication that the user (the administrator) of the management device 12 designates the partial communication area and the management device calls terminal device 14 which is in the designated partial communication area. The designated area communication has two forms of communication as well as the neighboring communication; communication with all of the terminal devices 14 which are in the designated partial communication area (a designated area plenary communication) and communication with the terminal device 14 belonging to the prepared group which has already been provided in the designated partial communication area (a designated area group communication).

In the embodiment, at the description of the designated area communication, it includes both of the designated area plenary communication and the designated area group communication.

The neighboring communication may be called the designated area communication that the neighboring area, that is, the coverage area of the wireless access point 13 connected to the terminal device 14 is selected as the partial communication area. In this case, the server 11 selects the partial communication area instead of the user.

FIG. 2 is a block diagram of the terminal device 14. As mentioned above, in terms of functions, the terminal device 14 is a wireless network device which transmits and receives a voice packet via the wireless access point (AP) 13 of the wireless LAN. A control unit 20 controls an action of the terminal device 14, which consists of a microprocessor. The control unit 20 has a storage unit 21 in which various data is stored. The configuration data which is downloaded from the server 11 is stored in the storage unit 21. An operation unit 22, a display unit 23, an audio circuit 24 and a wireless LAN communication unit 25 are connected to the control unit 20. The operation unit 22 includes key switches such as the PTT switch 220, which receives the user's operation such as switching on/off of the neighboring calling mode or selecting the identification number of the communication partner and inputs the operation signal into the control unit 20. The identification number of the communication partner is the number which is selected for the user to designate the communication partner (the target device). The individual number, the group number, or the plenary number is used as the identification number of the communication partner. The identification number of the communication partner (the identifying information of the communication partner) is corresponding to the transferred information of the present invention. The display unit 23 includes a liquid-crystal display, which shows an identification number of the communication partner whom the user's operation selects, the identification number of the called communication partner contained in the called audio signal and the like.

The audio circuit 24 has a microphone 240 and a speaker 241. The control unit 20 decodes the received voice packet and inputs it into the audio circuit 24. The audio circuit 24 converts the decoded audio signal to the analog signal and outputs it through the speaker 241. The audio circuit 24 also converts the audio signal input by the microphone 240 to the digital signal and inputs it into the control unit 20. The control unit 20 packetizes the digital audio signal to the voice packet and inputs it into the wireless LAN communication 25. The wireless LAN communication unit 25 has a circuit which performs wireless communication by the communication method complying with IEEE802.11. The wireless LAN communication unit 25 transmits the packet input from the control unit 20 to the wireless access point 13 and inputs the received packets from the wireless access point 13 into the control unit 20.

When the user speaks to the microphone 240 with pressing the PTT switch 220, the terminal device 14 converts the voice (audio) signal to the voice packet and transmits it to the server 11.

The voice packets has a constitution as shown in FIG. 3. In the payload of the voice packet, a payload includes an identification number of the communication partner, a source terminal number, area information and a neighboring communication flag along with the digitalized audio signal. The area information is information for designating the partial communication area in the case of the neighboring communication or the designated area communication. In the case of the neighboring communication, the number of the connecting wireless access point 13 (the AP number) is contained, and in the case of the designated area communication, the designated information of the partial communication area designated by the user (the administrator) of the management device 12 (the AP number) is contained. The area information may be contained only in the case of the neighboring communication or the designated area communication, and it may also be contained in the case of other communication forms.

In the embodiment, a SSID of the wireless access point 13 is used as the AP number for identifying the wireless access point 13, and a MAC address of the wireless access point 13 is also used as the SSID of each wireless access point 13. However, the AP number of the wireless access point 13 is not limited to the SSID and the SSID of the wireless access point 13 is not limited to the MAC address.

The neighboring communication flag is a flag set in the case of the neighboring communication or the designated area communication. In the voice packet of the embodiment, the neighboring communication flag is provided in the payload and it becomes possible to identify that it is the neighboring communication or the designated area communication because the neighboring communication flag is set. However, the neighboring communication flag is not essential. For example, if the area information is made to contain only in the case of the neighboring communication or the designated area communication, it is possible to determine whether it is the neighboring communication or the designated area communication, or the other communication by the presence or absence of the area information.

A header of the voice packet includes a destination address and a sender address. The final destination of the audio signal is not the server 11 but the terminal device 14 of the communication partner designated by the identification number of the communication partner, although the IP address of the server 11 is contained in the destination address of the voice packet transmitted from the terminal device 14.

The server 11 takes out the payload from the voice packet and transfers the audio signal to the terminal device 14 of the communication partner when the voice packet is received. In case that the identification number of the communication partner is the group number or the plenary number, the audio signal is transferred to a plurality of the terminal devices 14 as the communication partner. That is, in the case of the group communication that the group number is contained as the identification number of the communication partner, the audio signal is transferred to a plurality of the terminal devices 14 belonging to the group. Moreover, in the case of the plenary communication that the plenary number is contained as the identification number of the communication partner, the audio signal is transferred to all the communicable terminal devices 14. In addition, when the neighboring communication flag is set, the audio signal is transferred to the terminal devices 14 in the designated group or all of the terminal devices 14 of the terminal devices 14 in the neighboring area (the partial communication area) because it is the neighboring communication.

That is, the identification number of the communication partner attached to the audio signal of the voice packet which the server 11 received is the group number, and in case that the neighboring communication flag is set, the audio signal is the audio signal of the neighboring group communication. Thus, the server 11 transfers the audio signal to the terminal devices 14 in the neighboring area of a plurality of the terminal devices 14 belonging to the group. Moreover, the identification number of the communication partner is the plenary number and the neighboring communication flag is set it is the plenary neighboring communication. The server 11 transfers the audio signal to the terminal devices 14 in the neighboring area of all the communicable terminal devices 14.

The neighboring calling mode (the neighboring communication mode) is switched on/off by the user's operation of the terminal device 14. The user can perform the neighboring communication by pushing the PTT switch 220 in a state in which the neighboring communication mode is ON. At this time, the terminal device 14 sets the neighboring communication flag of the voice packet transmitted to the server 11. As the neighboring communication is aimed at communicating with the terminal devices which is in the neighboring area the action of the terminal device 14 may be limited not to receive the individual communication with a designated terminal device 14 as the communication partner in a state in which the neighboring communication mode is ON because the neighboring communication aims at communicating with a unspecified terminal device 14 or the terminal device 14 belonging to the group in the neighboring area.

So as to transfer the audio signal, a new voice packet which contains the IP address of the transferred terminal device 14 as the destination address and the IP address of the server 11 as the sender address is generated. In the new voice packet, the identification number of the communication partner of the payload and connecting AP number of the payload is the same as the voice packet the server 11 received. The source terminal number may be cleared, or the same of the voice packet which the server 11 received may be attached.

To summarize the above process, the terminal device 14 transmits the voice packet containing the audio signal input from the microphone 240 and the attached partner ID number without a procedure for establishing communication such as a SIP procedure when the PTT switch 220 is turned on. The server 11 transfers the audio signal to the communication partner identified by the partner ID number. Thus, the audio communication system of the embodiment allows the user to start communication almost at the same time of turning on the PTT switch 220, and to perform communication with a sense of use like using the conventional wireless communication transceiver due to starting the communication by transmitting the voice packet (RTP packet). For the sense of use, the server 11 manages the IP address, the group and the like of each terminal device 14, and transfers the audio signal.

The terminal device 14 has a VOX circuit as well as the PTT switch 220. The VOX circuit is the circuit that determines whether a talking voice (the audio signal) is input on the basis of the input level of the microphone 240 and the duration time, and makes the terminal device switch to the transmission state (PTT switch is turned on), when it is determined that the talking voice is input. The terminal device 14 may switch transmitting on/off using the VOX circuit, instead of the PTT switch 220 or with PTT switch 220. A general wireless communication transceiver has a simplex system which cannot receive a radio signal during transmitting. On the other hand, the terminal device 14 can transmit and receive the voice packet simultaneously because the audio signal is transmitted and received by the voice packet communication via the wireless LAN 16. The terminal device 14 can communicate by a full-duplex method which transmits and receives the audio signal simultaneously. Not to keep transmitting a silent voice packet, even when it performs the full-duplex communication, the terminal device 14 edits and transmits the voice packet by the PTT switch 220 or the VOX function only in case that the talking voice is input.

Figure 4:
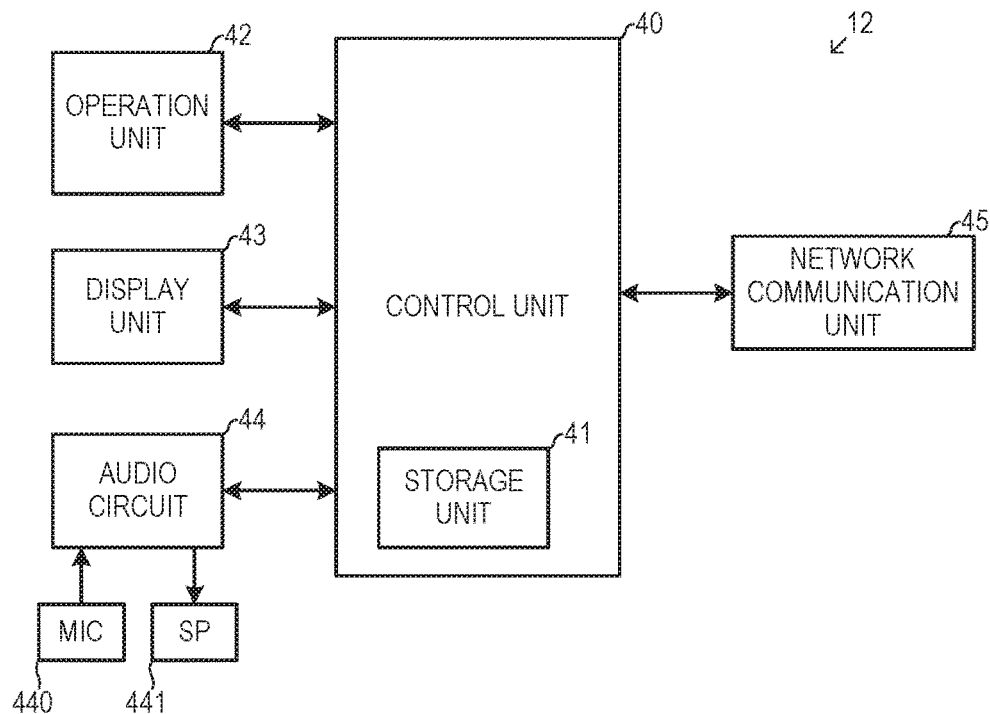
FIG. 4 is a block diagram of a management device.

FIG. 4 is a block diagram of a management device 12. As described above, the management device 12 is, for example, consists of a personal computer in which a management program is installed. The management device 12 has a control unit 40, a storage unit 41, a network communication unit 45, an operation unit 42, a display unit 43 and an audio circuit 44. The management device 12 accesses the server 11 in response to the operation by the administrator and can perform audio communication with another terminal device 14 as well as the terminal device 14. The operation unit 42, the display unit 43 and the audio circuit 44 may be external.

The control unit 40 proceeds the management program stored in the storage unit 41, accesses the server 11 in response to the operation by the administrator and controls the action of the device so as to communicate with another terminal device as well as the terminal device 14. The storage unit 41, for example, consists of a hard disk, a RAM and the like. The network communication unit 45 controls communication with the wired network 15.

The operation unit 42 has an input device such as a keyboard or a mouse and inputs the operation signal into the control unit 40 receiving the user's operation. The operation signal input from the operation unit 42 is, for example, setting/releasing the designated area communication mode, designating the area, starting/finishing the call (a PTT operation) or the like. The display unit 23 includes a liquid-crystal display, which shows an operation display for setting a table of the server 11, an operation display for designating the area and the like. On the liquid-crystal display, the identification number of the communication partner whom the user's operation selects, the identification number of the called communication partner and the like are also shown.

As described above, the management device 12 can perform the audio communication as well as the terminal device 14. The communication which the management device 12 can perform is the individual communication, the group communication, the plenary communication and the designated area communication (the designated area group communication and the designated area plenary communication). The management device 12 can perform these communications by almost the same processing with the terminal device 14. In the case of the designated area communication, the AP number designated by the administrator is contained in the area information of the voice packet which the management device 12 transmits to the server 11.

In case that the identification number of the communication partner attached to the audio signal of the voice packet which the server 11 receives from the management device 12 is the group number and the neighboring communication flag is set, it is the audio signal of the designated area group communication. The server 11 transfers the audio signal to the terminal device 14 in the designated area identified by the AP number of the area information of a plurality of the terminal devices 14 belonging to the group. Furthermore, in case that the identification number of the communication partner attached to the audio signal of the voice packet is the plenary number and the neighboring communication flag is set, it is the audio signal of the designated area plenary communication. The server 11 transfers the audio signal to the terminal device 14 in the designated area identified by the AP number of the area information of all the communicable terminal devices 14.

Transferring the audio signal by the server will be explained. The server 11 transfers the audio signal contained in the voice packet received from the terminal device 14 via the network 17 to the terminal device 14 of the communication partner via the network 17. In the case of the group communication, the audio signal is transferred to a plurality of the terminal devices 14 as the communication partner. In the case of the group communication, it may occur that a plurality of the users speak at the same time and the audio signals are transmitted from a plurality of the terminal devices 14 to the server 11 simultaneously. In this case, the server 11 edits a new audio signal mixing the received audio signal, makes the voice packet containing the mixed new audio signal, and transfers it to each terminal device 14. Note that the server 11 mixes individually for each terminal device 14, and the audio signal transmitted by the device itself is not made to be included and returned in the mixed audio signal for each terminal device 14. That is, the audio signal mixed all received audio signals are transferred to the terminal device 14 which does not transmit the audio signal, and the audio signal mixed the received audio signals other than that transmitted by the terminal device 14 is transferred to the terminal device 14 which transmits the audio signal. Thus, echoes of the self-transmitted audio signal are canceled in the terminal device 14. In the case of the plenary communication, the neighboring communication or the designated area communication, the mixing is also performed in the same manner as the group communication described above.

Figure 5:
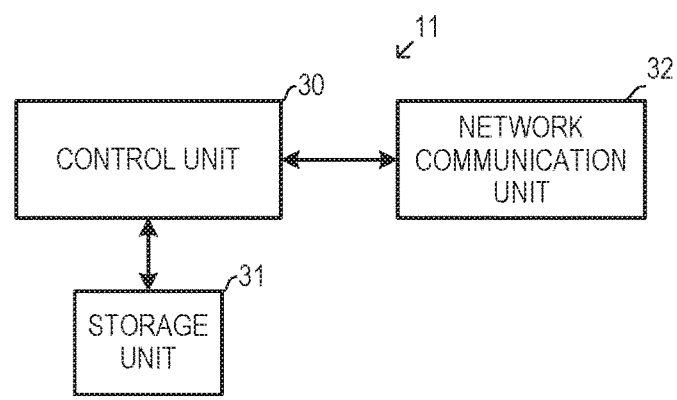
FIG. 5 is a block diagram of a server.

FIG. 5 is a block diagram of the server 11, which has a control unit 30, a storage unit 31 and a network communication unit 32. The storage unit 31, for example, consists of a hard disc, RAM and the like, and stores tables shown in FIG. 6, the configuration data of each terminal device 14 and the like. The control unit 30 sets up the terminal device 14, mixes the audio signal. The network communication unit 32 controls the communication with the wired network 15.

FIGS. 6A, 6B, 6C and 6D are diagrams showing tables provided in the storage unit 31 of the server 11.

FIG. 6A shows a terminal table which is provided in the server. A terminal table 301 is a table for the server 11 managing the terminal device 14. Each terminal device 14 is identified by the identification number (the terminal number) which is assigned uniquely. In the terminal table 301, an active flag, a storage address of the configuration data and a connecting AP number for every terminal number are stored in the terminal table 301. The active flag shows that the terminal device 14 is connected to the network 17, is registered by the server 11 and has downloaded various data by accessing the server 11, that is, it is possible to perform radio communication by completing the registration. The active flag is set when the server 11 completes the registration of the terminal device 14. The configuration data is, for example, the updating data of the program (a firmware), its own group, an address book storing another group which is permitted to communicate and the like. The connecting AP number is information that the terminal device 14 identifies the connecting wireless access point 13. In the embodiment, the SSID of the wireless access point 13 is used as the AP number. The information is used for determining in what area the terminal device 14 is.

The terminal device 14 is connected to the network 17 on start-up. The server 11 transmits the configuration data to the terminal device 14 and proceeds the registration processing to set up the terminal device 14 for a communicable state when the terminal device 14 is connected to the network 17. The registration processing includes the processing for setting the active flag of the terminal table 301, receiving the connecting AP number from the terminal device 14 writing it into the terminal table 301 or the like. Moreover, the server 11 updates the registration of the terminal device 14 communicating with the terminal device 14 at the appropriate timing thereafter. Updating the registration means, for example, updating the connecting AP number. The appropriate timing thereafter means, for example, at regular time intervals or when the connected wireless access point 13 is switched. The registration or updating the registration is performed on the basis the registration request transmitted to the server from the terminal device 14. The server 11 performs the registration of the terminal device 14 or updating information of terminal table 301 on the basis of the registration request. The management device 12 may update the connecting AP number of the terminal table 301. That is, the connecting AP number may be updated by the manual operation of the administrator, instead of being updated the server 11 receiving the registration request from the terminal device 14.

The registration request is also transmitted to the server 11 as the voice packet. The voice packet which contains the registration request is the form of the packet same as the packet shown in FIG. 3 (the RTP packet). However, the payload consists of only control information without the audio signal because it is not aimed at transmitting the audio signal. The control information includes, for example, information (flag) that shows the registration request, the connecting AP number, the source terminal number and the like. The identification number of the communication partner is not necessary. The server 11 determines it is the voice packet of the registration request when such a form of the voice packet is received and proceeds another registration processing without targeting of the processing of receiving the voice packet described in FIG. 10A.

In the terminal table 301 of FIG. 6A, the terminal number "0" means the management device 12. That is, information of the management device 12 is stored on the line of "0" of the terminal table 301. Since the management device 12 is managed by the administrator and connected to the wired network 15, information of the storage address of the configuration data or the connecting AP number is not necessary, which is not stored.

When the information of another active terminal device 14, an address book and the like is downloaded by the registration processing, the terminal device 14 shows the terminal number of the active terminal device 14 described above and the group number which is permitted to communicate as a candidate of the communication partner on the display unit 23.

FIG. 6B shows a group table 302, which is the table for the server 11 to manage the group. Each group is identified by the identified number (the group number) which is put respectively so as to be unique. The group number and the terminal number of the terminal device 14 (a belonging terminal device) which belongs to the group are stored in the group table 302 for every group number. The terminal device 14 which belongs to the group may be one or more. The group registered in the group table 302 is corresponded with the prepared group in the embodiment. A terminal table 301 and the group table 302 are provided in the server 11 by the management device 12 operated by the administrator.

FIG. 6C shows a mixing table (a session table) 303. FIGS. 7A and 7B respectively shows examples of registering the neighboring communication session or the designated area communication to the mixing table 303. The mixing table 303 is the table for the server 11 to manage the communication session. The communication session is a communication state among a plurality of the terminal devices 14 with the server 11 as the relaying device. The mixing table 303 has a plurality of lines, and each line stores one unit of information of a communication session. When the audio signal (the voice packet) is received from the terminal device 14, the server 11 determined which communication session the audio signal is distributed in by referring to the mixing table 303.

When the server 11 receives the calling voice packet, which is the first voice packet, from the terminal device 14, the communication session based on the voice packet is registered in the mixing table 303.

For each communication session, items such as a session number, a calling terminal number, a participating terminal number, an extra terminal number, an excluded terminal number and remaining holding time (T1) are provided in the mixing table 303. The session number is the number for identifying the communication session. The calling terminal number is the terminal number of the terminal device 14 (the calling terminal device) for transmitting the first voice packet (a calling voice packet) of the communication session. In the embodiment, the partner ID number contained in the calling voice packet is used for the session number, though any unique value for each communication session may be used. The communication session that the terminal number is registered as the session number (such as "19") is the communication session of the individual communication, which is the one-on-one, individual communication between the terminal devices 14. The communication session that the group number is registered as the session number (such as "G1") is the communication session of the group communication, which is the communication that a plurality of the terminal devices 14 (typically more than 3) exchange the audio signal mutually. Furthermore, the communication session whose plenary number "A" is registered as the session number is the communication session of the plenary communication (a plenary communication session), which is the communication for exchanging the audio signals mutually among all of the communicable terminal devices connected to the network 17.

The participating terminal number is a list of the terminal number of the terminal device 14 which participates in the communication session. When the voice packet is transmitted from the terminal device 14 whose terminal number is registered in the participating terminal number, the control unit 30 transfers the voice packet to another terminal device 14 whose terminal number is registered in the participating terminal number, therefore executes the mutual communication between the participating terminal devices.

In the case of the group communication session, the participating terminal number is the terminal number of the calling terminal device and the terminal number of the terminal device 14 which belongs to the group designated by the communication partner. However, as the terminal device 14, which belongs to the group but is not active or which performs another individual communication session, cannot participate in the group session, the terminal numbers thereof are excluded from the participating terminal number (which are registered in a field of excluded terminal numbers). In case that the calling terminal device 14 does not belong to the group, that is, the terminal device 14 calls a group other than its own belonging group, the terminal number thereof is also registered as the participating terminal number. The terminal number is registered simultaneously in a field of an extra terminal number as an extra terminal device registered temporarily as a member. That is, the calling terminal device is treated as the terminal device 14 participating in the communication session (the participating terminal device) as well as the terminal device 14 belonging to the group, even if it does not belong to the group. Note that, the fields of the extra terminal number and the excluded terminal number are not essential. It is possible to manage the table only by adding or by excluding the terminal number in the item of the participating terminal number.

In the case of the plenary communication session, the terminal number of the calling terminal device and the terminal numbers of all communicable terminal devices 14 are registered as the participating terminal number. The excluded terminal number is same as the group communication. The extra terminal number is not registered.

In the case of the individual communication session, the terminal number of the calling terminal device and that of the terminal device 14 of the communication partner are registered as the participating terminal number. The extra terminal number and the excluded terminal number is not registered because of one-on-one communication.

In the case of the neighboring group communication session, the terminal numbers of the calling terminal device and of the terminal device 14 which is in the designated area (in a neighboring area) of the terminal devices belonging to the group are registered as the participating terminal number. Moreover, in the case of the plenary neighboring communication session, the terminal numbers of the calling device and of the terminal device 14 which is in the designated area (in the neighboring area) of all communicable terminal devices 14 are registered as the participating terminal number.

For example, in the neighboring communication session of the session number "G1" in FIG. 7A, in case that there are the terminal devices of the terminal number "1" and "2" respectively in the area (in the neighboring area) wherein the terminal device 14 of the terminal number "3" as the calling terminal of the terminal devices 14 ("1", "2", "3", "4", and "5") belonging to the group number "G1", the terminal devices of the terminal number "1" and "2" are the communication partner. That is, the participating terminal numbers of the session number "G1" are "1", "2", and "3". The terminal devices 14 of the terminal number "4" and "5" which belong to the group number "G1" but are not in the neighboring area are registered as the excluded terminal.

In the case of the designated area group communication session, the terminal number of the management device 12 which is the calling terminal device and the terminal number of the terminal device 14 which is in the designated area of the terminal devices belonging to the group are registered as the participating terminal number. In the designated area plenary communication session, the terminal number of the calling terminal device (the management device 12) and the terminal number of the terminal device 14 which is in the designated area of all of the communicable terminal devices 14 are registered as the participating terminal number.

For example, if "the wireless access point 13-2" is selected as the designated area in the designated area communication session of the session number "A" in FIG. 7B and the terminal number "99" is the only terminal device 14 in the designated area, "the wireless access point 13-2", of all the communicable terminal devices, the terminal device 14 of the terminal number "99" becomes the communication partner. Thus, the participating terminal number of the session number "A" is "0" and "99". The terminal device 14 which is not in the designated area, "the wireless access point 13-2", and the terminal device 14 which is in the designated area, "the wireless access point 13-2", but is not active are registered as the excluded terminal.

In case that the communication session is performed in the form of the neighboring communication or the designated area communication in this way, information that shows it is the neighboring communication or the designated area communication is not registered in the mixing table 303. By adding or excluding the terminal number to register in the item of the participating terminal number, it is adapted to the neighboring communication or the designated area communication.

In case that the participating terminal device in the neighboring communication session or the designated area communication session moves to another area in the middle of the communication session, that is, in case that it is connected to another wireless access point 13, it is excluded from the participating terminal device of the communication session at that moment. That is, the terminal number of the terminal device 14 is moved from the item of the participating terminal number to the item of the excluded terminal number. On the other hand, when the terminal device 14 excluded from the communication session because it is out of the designated partial communication area in the neighboring communication session or the designated area communication session moves to the designated partial communication area, that is, in case that it is connected to the designated wireless access point 13, it is registered as the participating terminal device of the communication session at that moment and becomes possible to participate in the communication session.

Holding time is the time the communication session is being kept without closing in a condition of no voice packet transmitted from the participating terminal device. The holding time of each communication session in the server 11 is set, for example, to 30 seconds. A holding timer (TS) of the mixing table 303 is the timer which counts a lapse of the holding time, when the voice packet is not transmitted. In the processing by the control unit 30 (referred in FIG. 9), the holding timer TS is counted down if the voice packet is not transmitted, and is reset to 30 seconds if the voice packet is transmitted. In the event the timer TS is up because the voice packet is not transmitted from the participating terminal device for 30 seconds, the communication session is canceled and information of the communication session is deleted from the mixing table 303.

In the communication session (call), it is for usually few seconds that one person speaks. The terminal device 14 divides the audio signal of the voices into short voice packets (20 milliseconds in the embodiment) and transmits it to the server. Furthermore, in the communication session, an interval between a talking voice and a next talking voice (silent time) is approximately from 0 to few seconds. Thus, the session is usually not canceled during the speech if the holding time is provided to 30 seconds. The holding time of the communication session is not limited to 30 seconds, it is provided to more than the maximum value of the silent time in general communication. Moreover, to continue the communication session, it is also necessary that the holding time is counted in each terminal device 14. The holding time (T1) of the terminal device 14 is shorter than that of the server 11 (TS=30 seconds). 5 seconds is set in the timer T1, for example. The user can start another communication session by predetermined operation from when 5 seconds elapses after turning off the PTT switch 220, even if the communication session is maintained in the server 11.

It may also divide the mixing table 303 into 2 tables, an executing mixing table and a saving table. The executing mixing table is a table for registering the session executing mixing, and generated on a high-speed memory. The session in which the communication (transmitting and receiving the voice packet) stops is transcribed into the saving table in a short time of about 200 milliseconds, and kept only during the holding time (T1) in the saving table. When the communication (transmitting and receiving the voice packet) occurs again during the holding time, the session is transcribe again into the performing mixing table, and used for performing mixing. Thus, it becomes possible to release rapidly each terminal device 14 from the mixing table 303.

Figure 8:
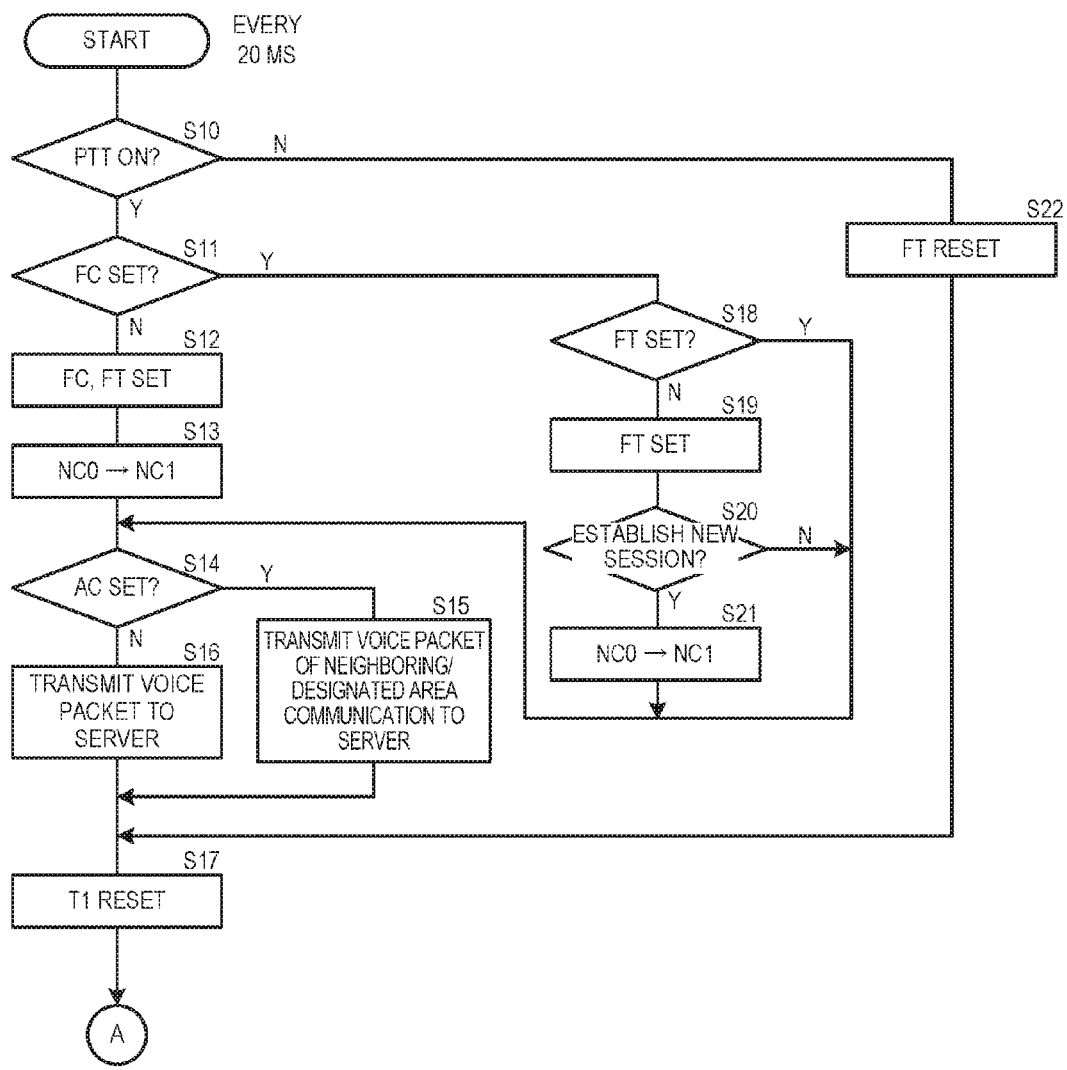
FIG. 8 is a process flowchart of a transceiver.
Figure 9:
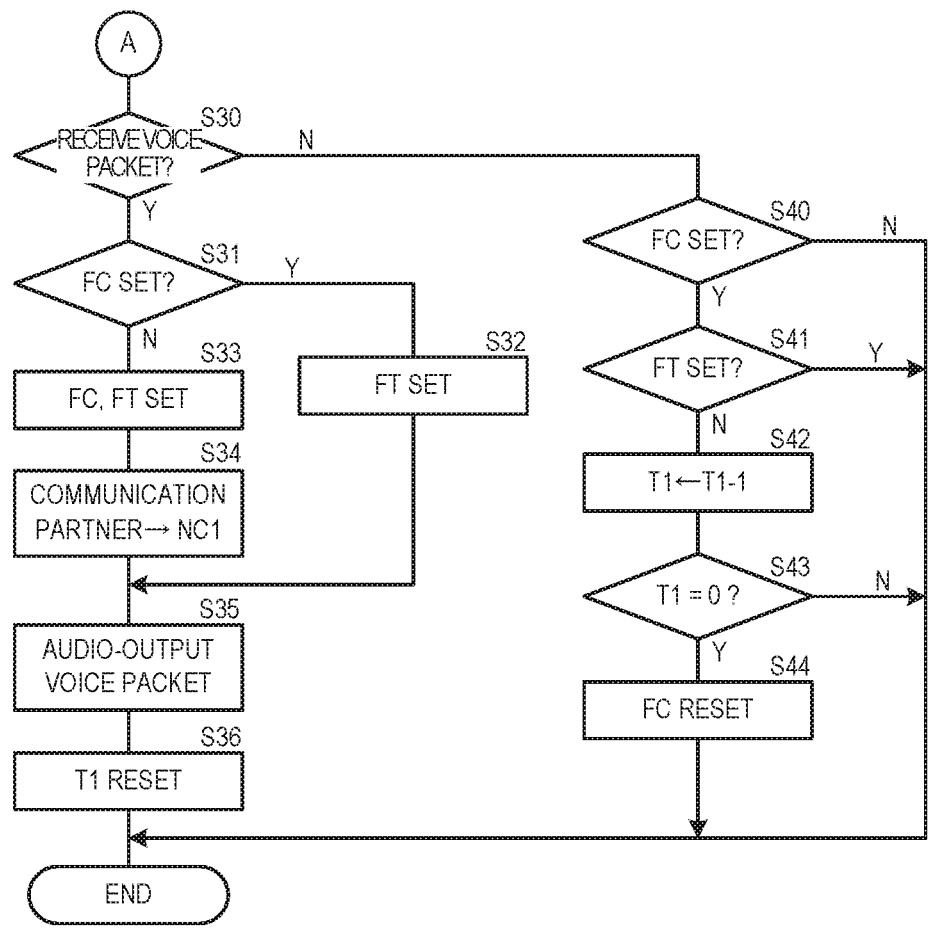
FIG. 9 is a process flowchart of a transceiver.

FIG. 8 and FIG. 9 are flow charts showing communication control processing performed by the control unit 20 of the terminal device 14. The processing is performed repeatedly every 20 milliseconds. Current communication state (status) is determined in response to turning on/off of the PTT switch 22 or receiving the voice packet (RIP packet). The kinds of flags or timers used in the flow chart are as follows.

PTT: It is the abbreviation of the Push-To-Talk switch (PTT switch) 220, which is not limited that the PTT switch 220 is turned on/off. It is also included that the transmission signal by the VOX circuit is on/off.

NC0: The identification number (the individual number/ the group number/the plenary number) of the communication partner selected by the operation of the user.

NC1: The session number, the identification number which identifies the performing communication session, and the identification number (the individual number/the group number/the plenary number) of the communication partner which is contained in the first voice packet establishing the communication session are used.

FC: A communication session flag (the flag showing that the terminal device 14 participates in the communication session)

FT: A communicating flag (the flag showing that the voice packet is being transmitted or being received)

AC: A neighboring communication flag (the flag showing that the communication session is the neighboring communication or the designated area communication)

T1: A holding timer (the timer counting the holding time (5 seconds) of the communication session)

S10-S20 are management processing for transmitting the voice packet. The control unit 20 determines the state of the PTT switch 220 (S10), which proceeds the processing to S11 in case that PTT switch 220 is being turned on, and proceeds the processing to S12 in case that the PTT switch is being turned off. In the description of the flowchart, turning on the PTT switch comprises turning on the transmitting function by VOX.

In S11, the control unit 20 determines whether the communication session flag FC is set or not. When the communication session flag FC is not set (No in S11), the voice packet which is generated by the PTT switch 220 being turned on this time is the calling voice packet. The control unit 20 sets the communication session flag FC and the communicating flag FT showing that the voice packet is being transmitted and received (S12). The control unit 20 transcribes the communication partner number NC0 selected by the user into the communication session number NC1 (S13), which determines whether it is the neighboring communication or the designated area communication on the basis of the neighboring communication flag AC (S14). It is the neighboring communication or the designated area communication if the neighboring communication flag AC is set. The neighboring communication flag AC is switched to set/reset by the user's operation of the terminal device 14.

When the neighboring communication flag AC is set in S14 (YES in S14), the control unit 20 transmits the neighboring communication flag (set), the area information (a connecting AP number), and the voice packet in which the communication session number NC1 is contained in its payload along with the audio signal to the server 11 as the calling voice packet (S15). On the other hand, when the neighboring communication flag AC is not set in S14 (NO in S14), the control unit 20 transmits the voice packet in which the neighboring communication flag is not contained (reset) and the connecting AP number and the communication session number NC1 is contained in the payload along with the audio signal to the server 11 as the calling voice packet (S16). By transmission of the calling voice packet, the communication session is started by the server 11. The control unit 20 proceeds management processing for receiving the voice packet after resetting the holding timer T1 to 5 seconds (S17).

In case that the communication session flag FC has already been set in S11 (YES in S11), the control unit 20 determines whether the communicating flag FT is set or not, that is, whether the voice packet is being transmitted or received (S18). When the communicating flag FT is not set (NO in S18), the control unit 20 sets the communicating flag FT (S19). In case that a new voice packet (talking voice of the user) is started transmitting with the state in which the communication session already started is maintained, the processing is proceeded from S11 to S18, and then to S19. In S20, it is determined whether to maintain the now existing communication session and reply the voice packet to the now existing communication session (NO in S20), or to leave the former communication session and transmit the voice packet to the new communication partner, that is, to establish another new communication session (YES in S20). It may be determined, for example, in response whether the operation by the user just before the PTT switch 220 turns on, the operation of selecting the communication partner or the like is performed or not. When the user selects a new communication partner, it may be proceeded by determination of S20 to establish a new communication session to the selected communication partner.

In case that a new communication is established (YES in S20), the control unit 20 transcribes the communication partner number NC0 which is selected then into the communication session number NC1 (S21), and proceeds the processing to S14. In case that the communication session which has already been started is kept (NO in S20), the control unit proceeds the processing to S14 directly from S20.

When the PTT switch 220 is not turned on in S10 (No in S10), the control unit 20 resets the communicating flag FT (S20). In addition, in case that the communicating flag FT has already been reset, it is kept as it is. Thereafter, the control unit 20 proceeds the management processing for receiving the voice packet in S30 or below.

The control unit 20 determines whether the voice packet is received via the network 17 or not in S30, which proceeds the processing to S31, when the voice packet is received, and proceeds the processing to S40, when the voice packet is not received.

In S31, the control unit 20 determines whether the communication session flag FC is set or not. When the communication flag FC is not set (NO in S31), a new communication session is established, and then the control unit 20 determines its first voice packet is transmitted and sets the communication session flag FC and the communicating flag FT (S33). The FT flag shows that the voice packet is being transmitted or received at that moment. The control unit 20 transcribes the communication partner number included in the voice packet into the communication session number NC1 (S34), outputs the voice packet to the audio circuit 24 in S35, and resets the holding timer T1 to 5 seconds (S36).

In case that the communication session flag FC has already been set in S31 (YES in S31), the control unit 20 sets the communicating flag FT in response to receiving the voice packet then (S32). If the communicating flag FT has already been set, it is kept as it is. After that, the control unit 20 proceeds the processing to S35.

In S30, when the voice packet is not received (No in S30), the control unit 20 determines whether the communicating flag FC is set or not (S40). When the communication session flag FC is set (YES in S40), the control unit 20 proceeds the processing in S41 and following steps. When the communication flag FC is not set (NO in S40), the control unit 20 finishes the processing without more steps.

In S41, the control unit 20 determines whether the communicating flag FT is set or not. When the communicating flag FT is set (Yes in S41), the control unit 20 finishes the processing without more steps. When the communicating flag FT is not set (No in S41), that is, in the state that the communication session flag FC is set though the communicating flag FT is reset, the control unit 20 subtracts 1 count (which corresponds to 20 milliseconds) from the holding timer T1 (S42), and determines whether the holding timer T1 becomes 0 or not by the subtraction (S43). When the holding timer T1 becomes 0 (Yes in S43), the control unit 20 resets the communication session flag to close the communication session (S44). In S43, when it is still greater than 0 in the holding timer T1 (No in S43), the control unit 20 finishes the processing without more steps.

The control unit 40 of the management device 12 also proceeds almost the same processing as the communication control processing in FIG. 8, FIG. 9 proceeded by the control unit 20 of the terminal device 14, however, in S15 in FIG. 8, the AP number of the partial communication area designated by the administrator is contained in the voice packet as the area information instead of the number of the wireless access point 13 to which the own device is connecting.

Figure 10A:
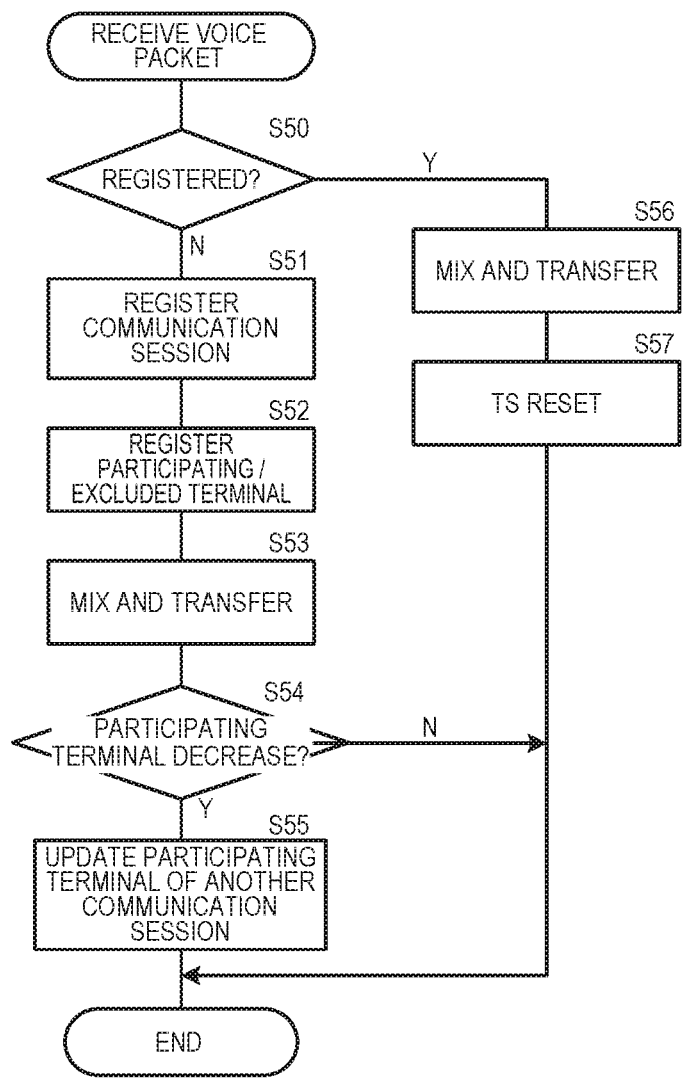
FIG. 10A is a process flowchart of the server.
Figure 10B:
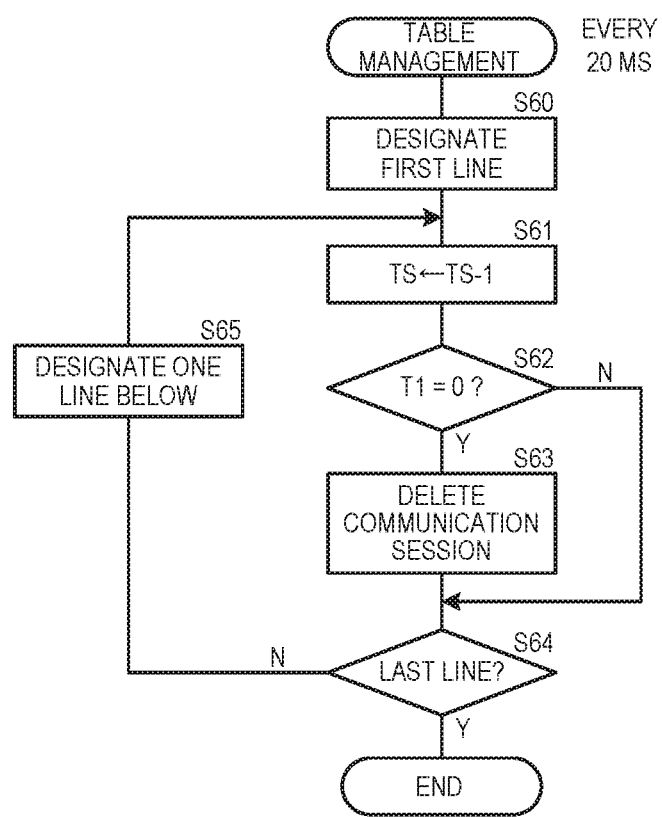
FIG. 10B is a process flowchart of the server.

FIGS. 10A and 10B are process flowcharts of the server 11. FIG. 10A shows the processing in receiving the voice packet. FIG. 10B shows the processing of the mixing table management.

In FIG. 10A, the control unit 30 determines whether the communication session identified by the calling source terminal number and the communication partner identification number has already been registered in the mixing table 303 when the voice packet is received (S50). In case that the communication session has already been registered in the mixing table 303 (YES in S50), the control unit 30 transfers the audio signal contained in the received voice packet to the terminal device 14 participating in the communication session on the basis of the participating terminal number of the mixing table 303 (S56), and resets the holding timer TS of the communication session of the mixing table 303 to 30 seconds (S57). Thus, thereafter for 30 seconds, the communication session is kept in the server device 11.

When the communication session of the received voice packet is not registered in the mixing table 303 (NO in S50), that is, when the voice packet is the calling voice packet, the control unit 30 registers a new communication session based on the calling voice packet in the mixing table 303 (S51). In the mixing table 303, the communication partner number is registered as the session number, and the terminal number of the terminal device 14 which is the calling source of the voice packet is registered as the calling terminal number.

The control unit 30 registers the numbers of the terminal devices 14 respectively corresponding to the items such as the participating terminal number and the excluded terminal number in the field of the communication session registered in S51 (S52). Rules of registration of the items such as the participating terminal number and the excluded terminal number are as follows.

In the individual communication session, the terminal number contained in the calling voice packet as the identification number of the communication partner and the calling terminal number are registered as the participating terminal number.

In the group communication session, the terminal number of the terminal device 14 belonging to the group number contained in the calling voice packet as the calling terminal number and the communication partner identification number is registered as the participating terminal number. When the calling terminal device does not belong to the group, the calling terminal number is also registered as the extra terminal number.

In the neighboring group communication session or the designated area session, the communication session whose session number is the identification number of the communication partner is established as usual, and the terminal number of the terminal device 14 in the partial communication area (the neighboring area) designated by the area information of the terminal devices belonging to the group is registered as the participating terminal number. The terminal number of the terminal device 14 which belongs to the group but is not in the designated partial communication area is registered as the excluded terminal number.

In the group communication session, the neighboring group communication session and the designated area group session mentioned above, in case that any terminal devices 14 which might be registered in the item of the participating terminal number are non-active or cannot participate in the communication session because of participating in another communication session, the terminal number is excluded from the item of the participating terminal number and transcribed into the item of the excluded terminal number.

In the plenary communication session, terminal numbers of all the active terminal devices 14 including the calling terminal number is registered as the participating terminal number. The terminal number of the non-active terminal device 14 is registered as the excluded terminal number. In the plenary neighboring communication session or the designated area plenary communication session, the communication session in which the identification number of the communication partner is the session number as usual is established and the terminal number of the terminal device 14 which is in the partial communication area (the neighboring area) designated by the area information of the active terminal devices 14 is registered as the participating terminal number. The terminal number of the terminal device 14 which is active but is not in the designated partial communication area is registered as the excluded terminal number.

In the above processing of S51, S52, the communication session which is adapted to the information contained in the calling voice packet is established and the participating terminal number and the like are registered. Thereafter, if the terminal device 14 participating in the communication session transmits the audio signal to the server 11 using the voice packet in which the session number of the communication session is contained in the identifying information of the communication partner, the audio signal is transferred to each participating terminal device. That is, after the communication session is established, it is not necessary for the terminal device 14 to determine whether the communication session is the neighboring communication and the designated area communication or not.

Since the server 11 performs the neighboring communication or the designated area communication by registering the terminal number of the terminal devices 14 which is in the designated partial communication area in the mixing table as the participating terminal number and registering others as the excluding terminal number, it is also not necessary for the sever 11 to determine whether the communication session is the neighboring communication and the designated area communication or not after the communication session is established.

After the communication session is established, the control unit 30 transfers the audio signal of the received voice packet to the terminal device 14 participating in the communication session (S53). The terminal device 14 participating in the communication session is determined by the participating terminal number of the communication session registered in the mixing table 303.

The control unit 30 detects the terminal device 14 to be excluded from the participating terminal device of the communication session registered beforehand because of participating the communication session established in S51 (S54). That is, each terminal device 14 can only participate in each single communication session. Thus, in case that the terminal device 14 which has been participating in the communication session established beforehand is to participate in another communication session established this time, it is necessary to be excluded from the communication session established beforehand. If there is any appropriate terminal device 14 (YES in S54), the terminal number of the terminal device 14 is excluded from the participating terminal number of the communication session established beforehand (S55). The excluded terminal number is transcribed into a column of the excluded terminal number. Thus, the participating terminal device of each communication session is optimized.

The management processing of the mixing table in FIG. 10B is performed periodically and repeatedly (for each 20 milliseconds, for example). The control unit 30 designates the communication session in the first line of the mixing table 303 (S60) at first, subtracts 1 count (for 20 milliseconds) from the holding timer TS of the designated communication session (S61), and determines whether the holding timer TS becomes 0 or not by the subtraction (S62). When the holding timer TS becomes 0 (Yes in S62), the control unit 30 deletes the communication session of the line as the communication session is finished (S63).

The control unit 30 manages the mixing table 303 by performing the processing above in order until the last line of the mixing table 303 (S64, S65).

The audio communication system of the embodiment makes it possible to manage the communication which limits the area of the terminal device 14 by managing the area in which each terminal device 14 is with using a plurality of the wireless access points 13 provided in each of a plurality of the areas. The server 11 operates the communication session which limits the area by using it because the server 11 can also add/exclude the participating terminal device in the regular group communication or the plenary communication. Thus, the operation of the communication session in which the area is limited in almost the same processing as the regular communication session becomes possible. The terminal device 14 can perform the calling limiting the area by attaching the information which designates the area in the voice packet transmitting the talking voice.

In the embodiment above, an area is divided for each cover area of each wireless access point 13 and it is used as the partial communication area respectively, however, the cover areas of a plurality of the wireless access points 13 may be used as a partial communication area. In this case, the area table shown in FIG. 6D may be provided in the server 11 and each partial communication area may be controlled.

FIG. 6D shows an area table. As mentioned above, the area table 304 is for managing the partial communication area. In the area table 304, the AP number is registered, which is information for identifying the wireless access point 13 provided in each partial communication area in response to the area number attached uniquely to each partial communication area. In the embodiment, as mentioned above, SSID of the wireless access point 13 is used as the AP number and a MAC address is used as the SSID of the wireless access point 13. The server 11 searches the area table 304 by the connecting AP number of the terminal table 301 and detects the partial communication area wherein the terminal device 14 is.

The area table shown in FIG. 6D may be used only for the designated area communication and the neighboring communication may be operated based on the neighboring area (the partial communication area) divided for each wireless access point 13.

Furthermore, in the neighboring communication, a wider area than the cover area of a wireless access point 13 may be used as the neighboring area. For example, both the cover area of the wireless access point 13 connected to the terminal device 14 and the cover area of another wireless access point 13 adjacent to the wireless access point 13 may be used as the neighboring area. In the case of such operation, position information of each wireless access point 13 may be made to store in the server 11 and the wireless access point determined by the AP number or another wireless access point 13 adjacent to it may be used as the neighboring area on the basis of the AP number contained in the voice packet received from the terminal device 14.

In the embodiment, the position of the terminal device 14 and the division of the partial communication area or the neighboring area are performed on the basis of the cover area of the wireless access point 13, however, it is not limited to this. For example, it may be possible that a GPS receiver is provided in the terminal device 14 and a coordinate value of the GPS may be used as the position information of the terminal device 14. It may be possible that the partial communication area is divided based on the floor or the room of the building in the cover area.

The designated area communication for designating the area desired by the user may be allowed to the terminal device 14. In the designated area communication, a plurality of the partial communication areas may be made to designate. In the case of such operation, a plurality of the area numbers (the AP number) may be made to write in the area information of the voice packet.

In the embodiment above, the non-active terminal device is excluded from the communication session as the excluded terminal device, however, it may be made to participate in the communication session in the middle at the time the terminal device becomes active.

In the embodiment described above, the communication session is established in response to the calling voice packet transmitted from the terminal device 14, however, a trigger of establishment of the communication session is not limited to this. For example, the administrator may establish or cancel the session group by operating the mixing table 303 from the management device 12.

REFERENCE NUMERALS

11 server (Relaying device)
12 management device
13 wireless access point
14 terminal device
20 control unit (of terminal device)
30 control unit (of server)
40 control unit (of management device)
32 network communication unit
220 Push-To-Talk (PTT) switch
301 terminal table
302 group table
303 mixing table
304 area table

What is claimed is:

1. A relaying device comprising:
   a network communication unit for communicating with a plurality of terminal devices via a communication network including a wireless network;
   a control unit for controlling communication of an audio signal among the terminal devices; and
   a storage unit comprising:
      a terminal table that stores position information of the terminal devices, the position information indicating where the terminal devices are present in a communication area of the wireless network, and the communication area being established through a plurality of access points, each of these access points having its coverage area within which the terminal devices belonging to one of the coverage areas are able to wirelessly communicate the audio signal to the one of the access points, wherein for each terminal device, the position information includes an identification of an access point connected to that terminal device;
      a group table that stores groups to which the terminal devices are assigned to belong, wherein the assignments of the terminal devices to the groups are prepared beforehand; and
      an area table that stores a plurality of partial communication areas into which the communication area is divided such that for each of the partial communication areas, wherein the area table includes identifications of one or more of the access points serving that partial communication area,
   when a calling terminal device, which is one of the terminal devices, makes a call that designates one of the partial communication areas and one of the groups, the one of the partial communication areas being defined as a designated partial communication area and the one of the groups being defined as a designated group, the control unit
      detects one or more of designated terminal devices such that for each designated terminal device, the access point connected to that designated terminal device as indicated in the terminal table is the access point serving the designated partial communication area as indicated in the area table, and that designated terminal device belong to the designated group as indicated in the group table, and
      establishes a communication session in which the calling terminal device and the designated terminal devices performs relaying processing to communicate the audio signal between the calling terminal device and the designated terminal devices, the audio signal being transferred to the designated terminal devices but not transferred to other terminal devices.

2. The relaying device according to claim 1, wherein:
the designated partial communication area is the partial communication area in which the calling terminal device is present.

3. The relaying device according to claim 1, wherein:
the control unit makes one of the terminal devices participate in the communication session when the one terminal device, which was out of the designated partial communication area, moves and enters there.

4. The relaying device according to claim 1, wherein:
the control unit makes one of the terminal devices participate in the communication session when the one terminal device, which belongs to the designated group and was out of the designated partial communication area, moves and enters there.

5. The relaying device according to claim 1, wherein:
the control unit excludes one of the designated terminal devices from the communication session when the one designated terminal device participating in the communication session moves out of the designated partial communication area.

6. The relaying device according to claim 1, wherein:
the control unit updates the position information stored in the storage unit by receiving information of a connecting wireless access point from the terminal devices periodically or at any predetermined timing, the information of the connecting wireless access point indicating which terminal devices are connecting to which access points.

7. The relaying device according to claim 1,
wherein the calling terminal device and the designated terminal devices are participating terminal devices of the communication session, and
wherein the control unit is configured to
 simultaneously receive audio signals sent from two or more participating terminal devices during the communication session,
 generate multiple new audio signals by mixing the simultaneously received audio signals, and
 transmit the multiple new audio signals to the participating terminal devices.

8. The relaying device according to claim 7,
wherein the control unit is configured to generate a different new audio signal for each of the participating terminal devices that simultaneously send the audio signals such that the new audio signal transmitted to each participating terminal device does not include the audio signal sent from that participating terminal device.

9. An audio communication system comprising:
a relaying device connected to a communication network including a wireless network; and
a plurality of terminal devices,
wherein the relaying device comprises:
 a network communication unit for communicating with the plurality of terminal devices via the communication network;
 a control unit for controlling a communication of an audio signal among the plurality of terminal devices; and
 a storage unit comprising
  a terminal table that stores position information of the terminal devices, the position information indicating where the terminal devices are present in a communication area of the wireless network, and the communication area being established through a plurality of access points, each of these access points having its coverage area within which the terminal devices belonging to one of the coverage areas are able to wirelessly communicate the audio signal to the one of the access points, wherein for each terminal device, the position information includes an identification of an access point connected to that terminal device;
  a group table that stores groups to which the terminal devices are assigned to belong, wherein the assignments of the terminal devices to the groups are prepared beforehand; and
  an area table that stores a plurality of partial communication areas into which the communication area is divided such that for each of the partial communication areas, wherein the area table includes identifications of one or more of the access points serving that partial communication area,
when a calling terminal device, which is one of the terminal devices, makes a call that designates one of the partial communication areas and one of the groups, the one of the partial communication areas being defined as a designated partial communication area and the one of the groups being defined as a designated group, the control unit
 detects one or more of designated terminal devices such that for each designated terminal device, the access point connected to that designated terminal device as indicated in the terminal table is the access point serving the designated partial communication area as indicated in the area table, and that designated terminal device belong to the designated group as indicated in the group table, and
 establishes a communication session in which the calling terminal device and the designated terminal devices performs relaying processing to communicate the audio signal between the calling terminal device and the designated terminal devices, the audio signal being transferred to the designated terminal devices but not transferred to other terminal devices; and
each of the terminal devices comprises a terminal communication unit for communicating with the relaying device via the communication network, a position information acquiring means for acquiring the position information of the terminal device, a position information updating means for transferring the acquired position information to the relaying device, and a calling means for transferring the calling of the terminal device in the designated partial communication area to the relaying device in response to a specific operation by a user.

10. The audio communication system according to claim 9, wherein:
the terminal network communication unit communicates with the relaying device via any one of the wireless access points;
the position information acquiring means acquires identifying information of the wireless access point with which the terminal device is communicating;
the position information updating means transmits the acquired identifying information of the wireless access point to the relaying device as the position information; and
the calling means transmits the call designating any one of the wireless access points to the relaying device.

11. The audio communication system according to claim 10, wherein
the calling means transmits the call to the terminal device that communicates with the designated wireless access point to the relaying device.

12. The audio communication system according to claim 9, wherein
the terminal device further comprises a push-to-talk circuit, and
the terminal network communication unit transmits the audio signal input from a microphone to the relaying device while the push-to-talk circuit is in ON status, and receives the audio signal transmitted from the relaying device regardless of that the push-to-talk circuit is in ON/OFF status.

13. The audio communication system according to claim 9,
wherein the calling terminal device and the designated terminal devices are participating terminal devices of the communication session, and
wherein the relaying device is configured to
 simultaneously receive audio signals sent from two or more participating terminal devices during the communication session,
 generate multiple new audio signals by mixing the simultaneously received audio signals, and
 transmit the multiple new audio signals to the participating terminal devices.

14. The audio communication system according to claim 13, wherein the relaying device is configured to generate a different new audio signal for each of the participating terminal devices that simultaneously send the audio signals such that the new audio signal transmitted to each participating terminal device does not include the audio signal sent from that participating terminal device.

15. A relaying method for relaying an audio signal using a relaying device having a network communication unit for communicating with a plurality of terminal devices via a wireless network and a storage unit for storing position information of the plurality of terminal devices, the position information indicating where the terminal devices are present in a communication area of the wireless network, and the communication area being established through a plurality of access points, each of these access points having its coverage area within which the terminal devices belonging to one of the coverage areas are able to wirelessly communicate the audio signal to the one of the access points, the method comprising:
a first step in which the relaying device divides a communication area of a communication network into a plurality of partial communication areas and stores, in the storage unit, a terminal table that stores position information of the terminal devices, wherein for each terminal device, the position information includes an identification of an access point connected to that terminal device, a group table that stores groups to which the terminal devices are assigned to belong, wherein the assignments of the terminal devices to the groups are prepared beforehand, and an area table that stores a plurality of partial communication areas into which the communication area is divided such that for each of the partial communication areas, wherein the area table includes identifications of one or more of the access points serving that partial communication area;
a second step in which, when a calling terminal device, which is one of the terminal devices, makes a call that designates one of the partial communication areas and one of the groups, the one of the partial communication areas being defined as a designated partial communication area and the one of the groups being defined as a designated group, the relaying device detects one or more of designated terminal devices such that for each designated terminal device, the access point connected to that designated terminal device as indicated in the terminal table is the access point serving the designated partial communication area as indicated in the area table, and that designated terminal device belong to the designated group as indicated in the group table, and establishes a communication session in which the calling terminal device and the designated terminal devices which is in the designated partial communication area that belongs to the designated group participate; and
a third step in which the relaying device transfers the audio signal received from the calling terminal device participating in the communication session to the designated terminal devices but does not transfer to other terminal devices.

16. The relying method according to claim 15, wherein the relaying device receives the call to the terminal device in the designated partial communication area in which the calling terminal device is in the second step.

17. The relaying method of the audio signal according to claim 15, further comprising:
a fourth step in which the relaying device makes the terminal device participate in the communication session
when the terminal device which is out of the designated partial communication area moves and enters there.

18. The relaying method of the audio signal according to claim 15, further comprising:
a fourth step in which the relaying device makes the terminal device participate in the communication session
when the terminal device which belongs to the prepared group and is out of the designated partial communication area moves and enters there.

19. The relaying method of the audio signal according to claim 15, further comprising:
a fifth step in which the relaying device excludes the terminal device from the communication session
when the terminal device participating in the communication session moves out of the designated partial communication area.

20. The relaying method of the audio signal according to claim 15, wherein:
the storage unit stores what wireless access point is connected to each terminal device as the position information; and
a designated one of the wireless access points is received in the second step as the designated partial communication area.

21. The relaying method of the audio signal according to claim 20, further comprising:
a sixth step in which the relaying device receives the information of the connecting wireless access point from the terminal device periodically or any predetermined timing, and updates the identifying information stored in the storage unit.

22. The relaying method according to claim 15,
wherein the calling terminal device and the designated terminal devices are participating terminal devices of the communication session, and
wherein the relaying method further comprises:
simultaneously receiving, at the relaying device, audio signals sent from two or more participating terminal devices during the communication session;
generating, by the relaying device, multiple new audio signals by mixing the simultaneously received audio signals; and
transmitting, by the relaying device, the multiple new audio signals to the participating terminal devices.

23. The relaying method according to claim 22,
wherein generating the multiple new audio signals comprises generating a different new audio signal for each of the participating terminal devices that simultaneously send the audio signals such that the new audio signal transmitted to each participating terminal device does not include the audio signal sent from that participating terminal device.

24. A relaying device comprising:
a network communication unit configured to communicate over a network with a plurality of terminal devices, the network comprising a plurality of access points configured to wirelessly communicate with the plurality of terminal devices;
a control unit configured to control communication among the plurality of terminal devices via the network communication unit; and
a storage unit including a terminal table, a group table, and an area table, the terminal table storing, for each terminal device, an identification of an access point connected to that terminal device, the group table including a plurality of groups and storing, for each group, a list of terminal devices assigned to that group, the assignments of the terminal devices to the groups being prepared beforehand, and the area table including a plurality of partial communication areas into which a communication area of the network is divided, the area table storing, for each partial communication area, identifications of one or more access points serving that partial communication area, wherein the control unit is configured to receive a voice packet from a calling terminal device via the network communication unit, the calling terminal device being one of the plurality of terminal devices, the voice packet including a designated partial communication area and a designated group, the designated partial communication area being one of the plurality of partial communication areas, and the designated group being one of the plurality of groups, generate one or more new voice packets each containing the received audio signal, and transmit the one or more new voice packets only to designated terminal devices of a communication session via the network communication unit, and wherein when the received voice packet includes the designated partial communication area and the designated group, the designated terminal devices include the terminal devices whose connected access point as indicated in the terminal table is the access point serving the designated partial communication area as indicated in the area table, and belongs to the designated group as indicated in the group table.

25. The relaying device according to claim 24, wherein the calling terminal device and the designated terminal devices are participating terminal devices of the communication session, and wherein the control unit is configured to simultaneously receive, via the network communication unit, a plurality of voice packets sent from two or more participating terminal devices during the communication session, generate multiple new audio signals by mixing the audio signals included in the simultaneously received voice packets, generate multiple new voice packets from the multiple new audio signals, and transmit, via the network communication unit, the multiple new voice packets to the participating terminal devices.

26. The relaying device according to claim 25, wherein the control unit is configured to generate a different new audio signal for each of the participating terminal devices that simultaneously send the voice packets such that the new audio signal included in the new voice packet transmitted to each participating terminal device does not include the audio signal sent from that participating terminal device.

* * * * *